Patented Aug. 7, 1934

1,969,497

UNITED STATES PATENT OFFICE 1,969,497

MANUFACTURE OF RUBBER BONDED ABRASIVE ARTICLES

Raymond C. Benner, Niagara Falls, N. Y., assignor to The Carborundum Company, Niagara Falls, N. Y., a corporation of Pennsylvania No Drawing. Continuation of application Serial No. 245,033, January 6, 1928. This application July 22, 1932, Serial No. 624,141. In Canada February 7, 1928

7 Claims. (Cl. 51—280)

This application is a continuation of my copending application, Serial No. 245,033 filed January 6, 1928.

The invention relates to the manufacture of rubber bonded abrasive articles and more especially to a process for bonding abrasive grains with an artificial dispersion of rubber and to the article so made.

By "a rubber dispersion", I mean a dispersion of the rubber in minute discrete particles suspended in the dispersing medium, such as water, as distinguished from a rubber solution.

Heretofore, in the usual process of making rubber bonded abrasive articles, the abrasive grains and vulcanizing materials have been milled into previously coagulated rubber by repeatedly passing the rubber and other materials between heavy metal rolls. This procedure requires considerable time, results in considerable wear on expensive machinery, and crushes the abrasive grains into smaller sizes. This crushing action makes it difficult, if not impossible, to make an abrasive article by this process with any degree of control of the grit size. Since the size of the abrasive grains is an important factor in the behavior of an abrasive article in use, this lack of control of the size of abrasive particles in the finished article is a particularly serious disadvantage of this process.

I have found that superior abrasive articles may be made without the above disadvantages by stirring the abrasive grain into a viscous, mushy, yet stirrable rubber mass, as hereinafter described.

Artificial dispersions of rubber can be prepared by several different methods and I have found that many of these processes are suitable for the manufacture of dispersions to be used by my process. Some dispersions are, however, open to objections of various kinds which I will discuss more fully later.

Fundamentally, the process of preparing an artificial dispersion of rubber consists in intimately admixing the rubber and a suitable colloid or dispersing agent, putting the rubber-colloid mixture into such condition that it will mix with sufficient water to disperse the rubber and then disrupting the mass of rubber into very small particles which do not cohere readily and which will remain in suspension in the aqueous vehicle.

I will now describe one process by which dispersions suitable for my purpose are made. It is to be understood, of course, that the example is for illustrative purposes only and that other processes may be used.

Crude rubber in the form known to the trade as "smoked sheet" or "pale crepe" is thoroughly mixed with about 10% by weight of natural clay such as bentonite. The mixing is done concurrently with, or subsequently to, the process known as "breaking down"; that is, the rubber is subjected to a mechanical treatment on regular rubber compounding rolls or by kneading in a machine of the bread mixer type whereby it is rendered more plastic and the bentonite is thoroughly dispersed through the mass of rubber.

The rubber-bentonite mixture is then subjected to a combined stretching and kneading action such as is obtained in a bread mixer (e. g., a so-called "Baker-Perkins mixer") while water is added. It is desirable that the water at first be added in relatively small quantities and that the mass be kneaded until the water is uniformly distributed through the mass. It is convenient to perform this treatment in a jacketed mixer so that the bowl of the mixer can be maintained at a temperature of about 140° F. at this stage and can be raised later when the water has all been incorporated.

The steps just described; namely, adding water and kneading, are repeated until a quantity of water approximately equal to the mass of the rubber has been added. It will be found that as more and more water is added, the quantity of water added each time can be increased without causing difficulties. For example, if too much water be added in the earlier stages of the process, the rubber is likely to cut up into pieces about the size of a small apple and it will be found necessary sometimes to remove some of the water by evaporation in order to get the mass consolidated into a piece which will catch in the blades of the mixer and get a kneading action. With proper care, however, this difficulty can be avoided.

It will be found that as the quantity of water incorporated in the mass increases, the rubber gets softer and "shorter" (by shorter is meant that it loses its stretchiness) and when the quantity mentioned above has been incorporated, the mass will be so soft that it is easily picked apart or penetrated by poking a finger into it.

The bowl of the mixer is then covered to retain the heat and moisture and the temperature of the jacket is raised slowly while the kneading is continued, the blades preferably being rotated more slowly than before. When the temperature of the jacket reaches about 200° F., the mass will suddenly invert from a continuous mass of rubber containing water to a continuous body of water containing rubber dispersed in it. This dispersion of rubber in water, which is a viscous, mushy, semi-solid yet stirrable mass, is the material I have found to be so satisfactory in the manufacture of rubber bonded abrasive articles and which I have termed rubber butter.

As stated above, other processes may be used for preparing the rubber dispersion. For example, rubber may be swollen by soaking it in a suitable "solvent" such as benzol or gasoline to form a fluid which is thin enough to be miscible with water.

The "solvent rubber" may then be mixed with a suitable emulsifying agent such as bentonite, soap, casein, gelatin, glue or the like and a dispersion made by agitating the solvent rubber with the water in the presence of the emulsifier. The benzol or other solvent may then be removed by evaporation, leaving a dispersion of rubber in water protected by the emulsifying agent. Such dispersions are, however, open to one objection—the presence of even small quantities of the rubber solvent in the finished abrasive article detracts from the strength of the article, and it is extremely difficult to remove the last traces of solvent.

Other emulsifying agents than bentonite can be used, provided proper precautions be taken. For example, the protein-bearing materials such as casein, glue or gelatin emit an offensive odor similar to that of burning flesh when they are heated. Since abrasive wheels are frequently employed for dry grinding, if these substances be used it is necessary to provide means for removing the fumes in such cases. Where lubrication or cooling is employed, the wheel is usually kept cool enough to prevent this burning, in which event no trouble from this cause is encountered. Another disadvantage of dispersions protected by these agents resides in the fact that they are less viscous than those prepared with bentonite and viscosity is an important factor in the making of abrasives from rubber dispersions, as will be brought out later.

Artificial rubber dispersions are particularly adapted for making bonded abrasive articles for several reasons. While it might appear, upon first thought, that artificial dispersions of previously coagulated rubber and natural latex are equivalents, since they are both dispersions of rubber in water, such is far from being true. The two are fundamentally different in several very important respects and they behave quite differently in practise. A consideration of the properties of the two materials will make these differences more apparent.

Latex has been found to consist of a dispersion of rubber particles in water, the particles being protected against agglomeration, and hence coagulation, by certain natural resins that are present. These rubber particles are extremely small, being of the order 0.5 to 2 thousandths of a millimeter in diameter. They exhibit considerable Brownian movement.

The rubber content of the latex varies considerably, depending, among other things, upon the kind and age of the tree from which it is tapped. It is normally about 30% in the average commercial product. It can be concentrated, in various ways, to contain as much as about 70% rubber. It is, whether in its natural state or concentrated, very easily coagulated and requires very careful manipulation to avoid coagulation. When used as a bond for abrasives, it must be thickened in some way or it will separate from the abrasive grain because it is not viscous enough to remain mixed. Although several methods have been proposed for accomplishing this, such as concentrating the latex, thickening with fillers and partially coagulating, none of these have been very successful commercially. Provision must also be made to coagulate the rubber about the abrasive grain or to thicken the latex by some means or the rubber will "cream" (concentrate at the top of the mix) while the article is being dried. Furthermore, there is no adhesion between the abrasive grain and the rubber. It is therefore impossible to manipulate the mix and the article must be formed from the wet mix and dried, pressed and vulcanized while being maintained in the desired shape. Abrasive articles bonded with latex are also open to the objection noted above with reference to protein-containing substances. The natural resins in latex which protect the rubber particles from coagulation contain proteins and wheels bonded with latex therefore emit offensive odors when used for dry grinding.

The artificial dispersion which I have described is much more stable than natural latex. It is made up of particles with an average diameter of about 10 thousandths of a millimeter. These particles have little or no Brownian movement. They are protected by a colloid such as bentonite or other clay, glue, soap, gelatin (as noted above I prefer bentonite) and the dispersion is much more stable (less easily coagulated) than is latex. Dispersions can be made to contain as high as 60–70% rubber. A dispersion which contains about 40% rubber, protected by clay, is considerably more viscous than latex of the same concentration. Being much more stable than latex, the artificial dispersions can be manipulated during the mixing operation without fear of causing premature coagulation. Furthermore, the coagulum from the artificial dispersion has, in the unvulcanized state, a decided adhesion to abrasive grain. As described in a copending application by Charles E. Nelson and Garnett H. Porter, Serial No. 384,520, filed August 8, 1929, abrasive mixes made from artificial dispersions can be dried and the resulting mixture can be broken down to the original abrasive grains without separation of the grain and rubber, the rubber being found in small pieces adhering to the grain. This cannot be done with a latex mix since the rubber from latex is so weakly adherent to the grain that if this disintegration is attempted, the result is a piece of rubber and a mass of loose, uncoated abrasive grain. Another way of expressing it might be that, in an abrasive mix formed from latex, the cohesion of the rubber is greater than the adhesion of the rubber to the grain, while with a mix made from an artificial dispersion the converse is true.

It will be seen, therefore, that latex and artificial dispersions are not equivalents (for use in abrasive mixes). They not only differ in particle size but they require a different technique in their manipulation and the resulting mixes have quite different properties.

Although the unvulcanized rubber from an artificial dispersion is relatively strongly adherent to abrasive grain, vulcanization reduces this grain to bond adhesion to the extent that it is impractical to make a very flexible soft rubber bonded abrasive article because if enough rubber is used so that the article can be flexed to an appreciable extent, the abrasive grains will become detached from the article as soon as the rubber is flexed. The grain is retained only by being "pocketed"

in the rubber mass and will "pop out" of the article as soon as the bond is bent or stretched sufficiently. This stretching may result from manual manipulation or, for example, from stresses caused by centrifugal force in a rotating wheel. The same is true, of course, of articles bonded with either sheet or latex rubber where there is at no time any grain to bond adhesion.

The amount of bond in a rubber bonded abrasive article is ordinarily not less than 5% nor more than 12%, the percentage being expressed in terms of the proportion of raw rubber to abrasive grain. If less than 5% be used, the article becomes too weak for most purposes; if more than 12% be used, the article approaches a rubber article filled with abrasive grain in contrast to an abrasive article bonded with rubber. As a matter of fact, except for very hard fine grit articles, it is rare that more than 10% rubber is used and for most purposes the rubber content is within the range 7-9%.

Since a comparatively small proportion of rubber is used in abrasive mixes, the quantity of abrasive grain is ordinarily such that the grain is self-supporting and the dispersion, in the concentrations commercially available, merely fills the voids in the mass of grain. The viscosity required, therefore, is one which will be sufficient to prevent the dispersion from flowing out of the mass of grain during the drying of the mix, and it is not necessary, as would be the case if the article were made to contain 30% or 35% rubber in dispersed form, for the dispersion to be sufficiently viscous to actually suspend and support the grain.

I have found, for example, that a dispersion protected by clay which contains as little as 35% rubber will remain mixed with the grain, whereas latex of the same concentration, being much more fluid, will flow out of the mix. Similarly, artificial dispersions protected by glue, casein or similar colloids are thinner than those made with clays although they are more viscous than latex. Accordingly, it is necessary, where the protein-containing colloids are employed, to use dispersions which are more concentrated than is required where clay is used as the dispersing agent. For example, 45% is about the minimum concentration of protein-colloid dispersion that will not separate from the grain.

I will now describe, in the form of example, several methods by which my process can be applied. It is to be understood that the examples are for illustrative purposes only and are not intended to limit the invention.

*Example I*

900 parts of #14 grit fused alumina abrasive grain are mixed with 25 parts of flowers of sulphur in finely divided condition and the mixture is heated to the melting point of sulphur whereby the grains are coated with a film of sulphur. 5 parts of magnesium oxide of the quality used in rubber compounding are then made into a paste with water and the paste is thoroughly mixed with sufficient rubber dispersion to contain 50 parts of rubber (for example, 125 parts of a dispersion containing 40% rubber). The mixture of magnesia and dispersed rubber is then mixed with the sulphur-coated abrasive grain by any suitable means and 5 parts of a 10% solution of lead acetate in water are added to cause coagulation of the rubber.

An article of the desired shape is then formed by filling a suitable mold with the wet mix. The mass in the mold is then dried by evaporating the water at a gradually reduced pressure and a temperature of about 150° F. The article is then pressed for about 15 minutes at approximately 3000 pounds per square inch in a hot press, the platens of which are heated by steam at 40 pounds per square inch gauge pressure. It is then removed from the mold, placed in an oven and cured for 14 hours at 320° F. to complete the vulcanization of the rubber.

*Example II*

850 parts of #36 grit aluminous abrasive grain are mixed with 50 parts of sulphur, 10 parts of water are added to ensure distribution of the sulphur through the grain (prevent lumping when the rubber is added) and 220 parts of a dispersion containing 45% rubber are added and thoroughly mixed with the grain and sulphur. The mix is then transferred to a suitable mold, dried in the mold at about 150° F. for about 16 hours, pressed for 20 minutes at 5000 pounds per square inch between platens heated by steam at 40 pounds per square inch gauge pressure and vulcanized in an oven for 12 hours at 320° F.

*Example III*

800 parts of #120 grit silicon carbide are wet with 10 parts of water and then mixed with 75 parts of sulphur, 15 parts of zinc oxide and 10 parts of carbon black. 150 parts of rubber in the form of a dispersion containing 35% rubber are then mixed with 15 parts of a 10% solution of lead acetate. Upon stirring, the dispersion thickens but does not coagulate as would latex under the same circumstances. The thickened dispersion is then added to and mixed with the grain-sulphur-zinc oxide-carbon black mixture. The resulting mix is then spread in pans, dried for 8 hours at about 150° F., tamped into a suitable mold and further dried for 16 hours at 225° F. The article is then pressed and vulcanized as noted above.

It will be seen from a consideration of the preceding examples that my process is adaptable to many variations, and that the ratio of sulphur to rubber is not less than about 1 to 2, thus insuring a hard rubber. It is possible to combine the ingredients in any order or by any method which does not militate against uniformity of mixing; by which I mean that the process will not, of course, produce a uniform product if steps are introduced which would prevent a uniform mixing (such as allowing the sulphur to lump) but, except for such precautions as are ordinarily essential to mixture making, is not limited to any particular procedure.

This adaptability is in marked contrast to latex, the use of which is complicated by the tendency for the rubber to coagulate, drain from the mix, "cream", or segregate by partial coagulation into small lumps, and by the complete absence of adhesion between abrasive grain and the rubber of latex.

Having thus described my invention, I claim:
1. The process of making hard rubber bonded abrasive articles, which comprises making a mix containing a major proportion of abrasive grain with a minor proportion of a mushy, semi-solid yet stirrable mass consisting principally of an artificial dispersion of particles of previously coagulated rubber in water and having sufficient viscosity to prevent separation of the rubber dispersion and abrasive grain during the drying operation, together with a sufficient amount of a vulcanizing agent to form a hard rubber bond, shaping abrasive articles therefrom and vulcanizing them, and drying the material subsequent to the mixing in of the abrasive grain and prior to the vulcanization of the articles.

2. The process of making hard rubber bonded abrasive articles, which comprises making a mix containing a major proportion of abrasive grain with a minor proportion of a mushy, semi-solid yet stirrable mass consisting principally of an artificial dispersion of particles of previously coagulated rubber in water and having sufficient viscosity to prevent separation of the rubber dispersion and abrasive grain during the drying operation, together with a sufficient amount of a vulcanizing agent to form a hard rubber bond, drying the mix, forming the abrasive articles therefrom, and vulcanizing them.

3. The process of making hard rubber bonded abrasive articles, which comprises making a mix containing a major proportion of abrasive grain with a minor proportion of a mushy, semi-solid yet stirrable mass consisting principally of an artificial dispersion of particles of previously coagulated rubber in water and having sufficient viscosity to prevent separation of the rubber dispersion and abrasive grain during the drying operation, together with a sufficient amount of a vulcanizing agent to form a hard rubber bond, shaping abrasive articles from the mix, drying the mix, and vulcanizing the articles.

4. The process of making hard rubber bonded abrasive articles, which comprises preparing from previously coagulated rubber a viscous, mushy, semi-solid yet stirrable mass of water and minute discrete rubber particles distributed therein in the presence of Bentonite clay, forming a mix containing a major proportion of abrasive grain with a minor proportion of such mass, together with a sufficient amount of a vulcanizing agent to form a hard rubber bond, forming the articles from the mixture, and vulcanizing them.

5. The process of making hard rubber bonded abrasive articles, which comprises preparing from previously coagulated rubber a viscous, mushy, semi-solid yet stirrable mass of water and minute discrete rubber particles distributed and suspended therein, mixing a major proportion of abrasive grain with a minor proportion of such mass together with a sufficient amount of a vulcanizing agent to form a hard rubber bond, shaping abrasive articles therefrom and vulcanizing them, and removing water from the material subsequent to the mixing in of the abrasive grain and prior to the vulcanization of the articles.

6. A hard rubber bonded abrasive article, comprising abrasive grain and less than 20% of a hard rubber bond resulting from the vulcanization of the rubber of an artificial aqueous dispersion of previously coagulated rubber and having the adhesion of bond to grain and the distribution of the grain in the bond obtainable by mixing abrasive grain with a viscous, semi-solid artificial dispersion of particles of previously coagulated rubber in water, removing water from the mix, and consolidating and vulcanizing the articles.

7. An abrasive article, comprising abrasive grain and less than 20% of a hard rubber bond resulting from the vulcanization of the rubber of an artificial aqueous dispersion of previously coagulated rubber, and having the adhesion of bond to grain, the uniform distribution of the grain in the bond and the preservation of the original grain size characteristic of abrasive articles made by forming a mix containing abrasive grain, a viscous, mushy, semi-solid yet stirrable mass consisting principally of an artificial dispersion of particles of previously coagulated rubber in water and a sufficient amount of vulcanizing agent to form a hard rubber bond, shaping the abrasive articles therefrom and vulcanizing them, and drying the mix subsequent to the mixing in of the abrasive grain and prior to the vulcanization of the articles.

RAYMOND C. BENNER.